US009099274B2

(12) United States Patent
Lee et al.

(10) Patent No.: US 9,099,274 B2
(45) Date of Patent: Aug. 4, 2015

(54) LATERAL FIELD EMISSION DEVICE

(75) Inventors: Cheol Jin Lee, Seoul (KR); Dong Hoon Shin, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 13/978,797

(22) PCT Filed: Jan. 10, 2012

(86) PCT No.: PCT/KR2012/000241
§ 371 (c)(1),
(2), (4) Date: Jul. 9, 2013

(87) PCT Pub. No.: WO2012/096499
PCT Pub. Date: Jul. 19, 2012

(65) Prior Publication Data
US 2013/0285009 A1    Oct. 31, 2013

(30) Foreign Application Priority Data
Jan. 11, 2011   (KR) .................. 10-2011-0002878

(51) Int. Cl.
*H01L 29/06*   (2006.01)
*H01L 29/43*   (2006.01)
*H01J 1/316*   (2006.01)
*B82Y 20/00*   (2011.01)

(52) U.S. Cl.
CPC ................. *H01J 1/316* (2013.01); *B82Y 20/00* (2013.01); *H01J 2201/30446* (2013.01); *H01J 2201/30469* (2013.01)

(58) Field of Classification Search
CPC ................ H01J 1/316; H01J 2201/304; H01J 2201/3043; H01J 2201/30434; H01J 2201/30442; H01J 2201/30446; H01J 2201/30449; H01J 2201/30453; H01J 2201/30469; H01J 2201/30476; H01J 2201/3048
USPC ....... 977/939; 257/10, 11; 438/20; 313/346 R
See application file for complete search history.

(56) References Cited

U.S. PATENT DOCUMENTS

| 5,289,086 | A | * | 2/1994 | Kane .............................. 315/349 |
| 5,793,153 | A | * | 8/1998 | Itoh et al. ...................... 313/306 |
| 2003/0090190 | A1 | * | 5/2003 | Takai et al. .................... 313/311 |
| 2005/0161668 | A1 | * | 7/2005 | Kastalsky et al. ............... 257/46 |

FOREIGN PATENT DOCUMENTS

| KR | 10-2000-0071254 | 11/2000 |
| KR | 10-2007-0062711 | 6/2007 |
| KR | 10-20100021898 | 2/2010 |

OTHER PUBLICATIONS

Liu et al. Field emission of graphene nanosheets, 2010, IEEE, abstract.*
International Search Report for International Application No. PCT/KR2012/000241, dated Aug. 29, 2012.

* cited by examiner

*Primary Examiner* — Julio J Maldonado
*Assistant Examiner* — Molly Reida
(74) *Attorney, Agent, or Firm* — Kile Park Reed & Houtteman PLLC

(57) ABSTRACT

Described is a lateral field emission device emitting electrons in parallel with respect to a substrate. Electron emission materials having a predetermined thickness are arranged in a direction with respect to the substrate on a supporting portion. An anode is disposed on a side portion of the substrate, the anode corresponding to the electron emission materials.

12 Claims, 7 Drawing Sheets

LATERAL FIELD EMISSION DEVICE

CROSS-REFERENCE TO RELATED APPLICATIONS

This application claims priority under 35 USC §119 to Korean Patent Application No. 2011-2878 filed on Jan. 11, 2011, the contents of which are herein incorporated by reference in its entirety.

BACKGROUND OF THE INVENTION

1. Field of the Invention

Example embodiments of the present invention relate to a lateral field emission device. More particularly, example embodiments of the present invention relate to a lateral field emission device of emitting electrons in parallel with respect to a substrate.

2. Description of the Related Art

Carbon nano tube (hereinafter, referred as to "CNT"), as an acicular electron emission material, has good characteristics of the electric, mechanical, chemical and thermal properties. Thus, CNT has been employed in a variety of applicable fields. CNT relatively has a low work function, a high aspect ratio and a nanosized end portion having a small radius of curvature such that CNT relatively has a large field enhancement factor (hereinafter, referred as to "β"). Accordingly, CNT has good electron emission efficiency even under a low electric field and in addition, CNT has good mechanical and chemical stabilities and high thermal and electrical conductivities.

Nowadays, research has been actively conducted on a planar electron emission material like graphene, graphite, etc. as well as the acicular electron emission material. Currently, the field emission device has a vertical structure in that a cathode and an anode are arranged perpendicular to faces of a substrate (ex. both a front face and a rear face of the substrate). Thus, it may be necessary to form a spacer in order to secure electron transport pathway between the cathode and the anode. In order to form the spacer, complicate processes may be required. Further, it may be difficult to integrate the field emission device due to the spacer.

SUMMARY OF THE INVENTION

Example embodiments of the present invention provide a lateral field emission device.

According to one aspect of the present invention, there is provided a lateral field emission device. The lateral field emission device includes a substrate, electron emission materials arranged in a direction with respect to the substrate, a supporting portion disposed on the substrate, the supporting portion supporting the electron emission materials, a cathode disposed on the substrate, the cathode being electrically connected to the electron emission materials and an anode disposed on the substrate, the anode being opposite to the cathode.

In some example embodiments, the lateral field emission device may further include a gate disposed between the cathode and the anode. Here, the gate may be disposed under an electron transport pathway between the electron emission materials and the anode. Further, the gate may include gate members disposed at both sides of an electron transport pathway between the electron emission materials and the anode.

In some example embodiments, the anode may include a side face at which electrons from the electron emission materials collide. Here, the electron emission materials may include at least one of a carbon nano tube, a nano carbon material, a semiconductor nanowire, metal nanowire, a carbon nanoplate, a graphene, and a graphene oxide.

In some example embodiments, the electron emission materials may include at least one of a carbon nano tube, a nano carbon material, a semiconductor nanowire, a metal nanowire, a carbon nanoplate, a graphene, and a graphene oxide.

In some example embodiments, the cathode, the anode and the gate may include a conductive material substantially identical to one another or different from one another.

According to one aspect of the present invention, there is provided a lateral field emission device. The lateral field emission device includes a substrate, a cathode structure disposed on one side portion of the substrate, the cathode structure including a supporting portion having a predetermined thickness, a cathode disposed on the supporting portion and electron emission materials electrically connected to the cathode and an anode disposed on another side portion of the substrate, the anode being opposite the cathode structure.

In some example embodiments, the cathode may partially cover the electron emission materials in the cathode structure.

In some example embodiments, the lateral field emission device may further include a gate disposed between the cathode structure and the anode. Here, the gate may include gate members disposed at both sides of an electron transport pathway between the cathode structure and the anode.

In some example embodiments, the anode may include a side face at which electrons from the electron emission materials collide.

In some example embodiments, the cathode, the anode and the gate may include a conductive material substantially identical to one another or different from one another.

In some example embodiments, the electron emission materials may include at least one of a carbon nano tube, a nano carbon material, a semiconductor nanowire, a metal nanowire, a carbon nanoplate, a graphene, and a graphene oxide.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

Figure 1:
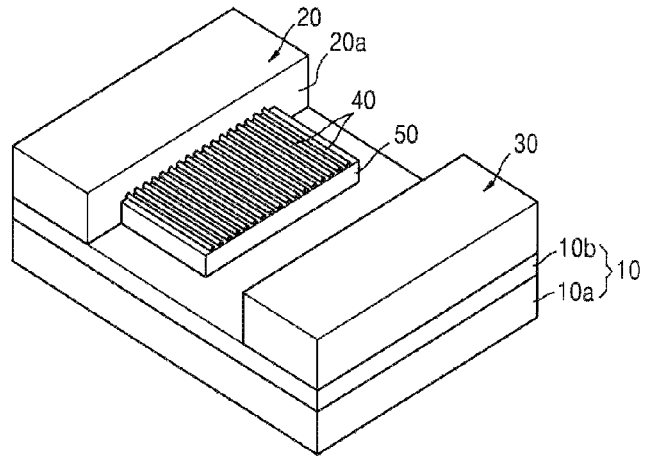
FIG. 1 is a perspective view illustrating a lateral field emission device having a two electrode (diode) structure in accordance with one example embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
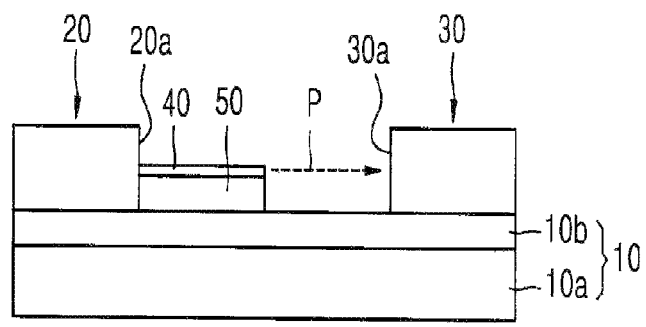
FIG. 2 is a side view of the lateral field emission device in FIG. 1.

FIG. 1 is a perspective view illustrating a lateral field emission device having a two electrode (diode) structure in accordance with one example embodiment of the present invention. FIG. 2 is a side view of the lateral field emission device in FIG. 1.

Referring to FIGS. 1 and 2, a lateral field emission device in accordance with one example embodiment of the present invention includes a substrate 10, electron emission materials 40, a supporting portion 50, a cathode 20 and an anode 30.

The cathode 20 and the anode 30 are positioned on the substrate 10. The cathode 20 and the anode 30 face each other and are apart from each other at a predetermined distance. The cathode 20 and the anode 30 may include a conductive material such as metal like gold (Au), silver (Ag), etc. The electron emission materials 40 are arranged toward the anode 30 and are positioned adjacent to a side portion of the cathode 20 opposite to the anode 30. The supporting portion 50 is disposed beneath the electron emission materials 40. The electron emission materials 40 may include acicular electron emission material or planar electron emission material. The acicular electron emission material may include a carbon nano tube (hereinafter, referred as to "CNT"), a nano carbon material, a semiconductor nanowire, metal nanowire, etc. The planar electron emission material may include a carbon nanoplate, a graphene, a graphene oxide, etc.

The supporting portion 50 may be formed using insulating materials such as poly methyl methacrylate (PMMA), silicon nitride (SiNx), etc. A front end portion of the electron emission materials 40, at which electrons are emitted as an emission end, is opposite to a central portion of a side face of the anode 30. Thus, electrons which are emitted from the electron emission materials 40 move along an electron transport pathway P, and then the electrons are able to collide at or land on the central portion of the side face of the anode 30. Meanwhile, rear end portions of the electron emission materials 40 may be electrically connected to the cathode 20. Further, the rear end portion of the electron emission materials 40 may make physically contact with a side face (or inner side face) 20a of the cathode 20 and may be fixed to the side face 20a of the cathode 20.

In case that the rear end portions of the electron emission materials 40 are fixed to the side face of the cathode 20, the rear end portion of the electron emission materials 40 may be partially buried at the side face 20a of the cathode 20.

The substrate 10 may have either a single layer structure or a multi layer structure. For example, a lower portion of the substrate 10 may correspond to a substrate body 10a. The substrate body 10a may include a silicon substrate or a silicon wafer. Further, an upper portion of the substrate 10 may correspond to an insulation layer 10b. The insulation layer 10b may be formed using silicon oxide.

In an example embodiment of the present invention, the substrate 10 may be formed using other well-known insulation material like glass.

When a power source is applied to the cathode 20 and the anode 30 included in the field emission device having a two electrode structure, electrons are emitted from the front end portion of the electron emission materials 40 being electrically connected to the cathode 20 and serving as a cold cathode. Then, the electrons may collide at an inner side face of the anode 30.

Figure 3:
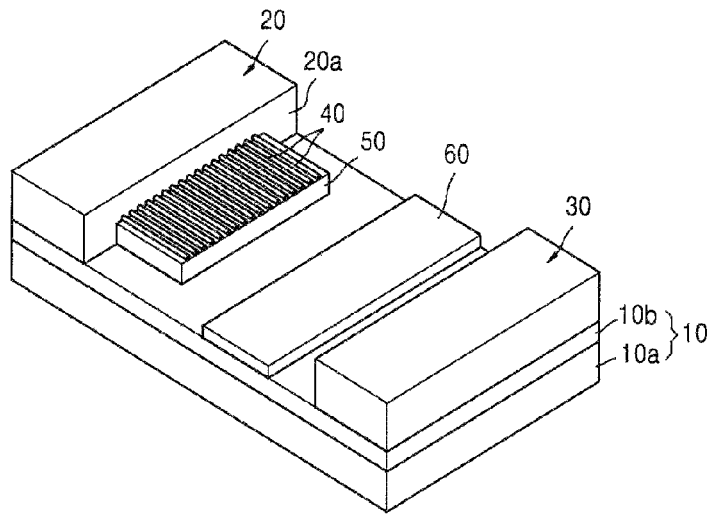
FIG. 3 is a perspective view illustrating a lateral field emission device having a three electrode (triode) structure in accordance with another example embodiment of the present invention.
Figure 4:
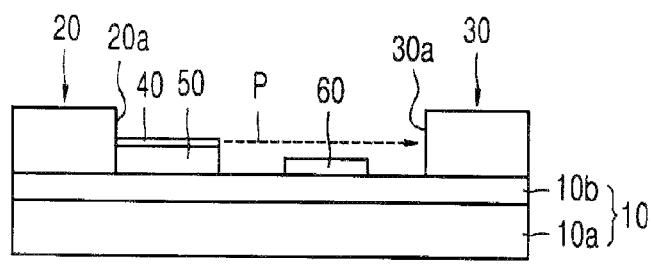
FIG. 4 is a side view of the lateral field emission device in FIG. 3.

FIG. 3 is a perspective view illustrating a lateral field emission device having a three electrode (triode) structure in accordance with another example embodiment of the present invention. FIG. 4 is a side view of the lateral field emission device in FIG. 3.

Referring to FIGS. 3 and 4, a lateral field emission device in accordance with another example embodiment of the present invention includes a substrate 10, electron emission materials 40, a supporting portion 50, a cathode 20, an anode 30 and a gate 60.

The cathode 20 and the anode 30 are positioned on the substrate 10. The cathode 20 and the anode 30 face each other and are apart from each other at a predetermined distance. The cathode 20 and the anode 30 may include a conductive material such as metal like gold (Au), silver (Ag), etc.

Both the supporting portion 50 supporting the electron emission materials 40 and the gate 60 are disposed between the cathode 20 and the anode 30. The supporting portion 50 and the gate 60 are spaced apart from each other at a predetermined distance. The gate 60 may have a height substantially identical to that of the supporting portion 50 or smaller than that of the supporting portion 50. Here, the gate 60 may have a height enough to form a proper gate (or control) field in an electron transport pathway P between the electron emission materials 40 and the anode 30. The height of the gate 60 may be adequately controlled to meet design requirements. The gate 60 may be formed using a material substantially identical to that of the cathode 20 or the anode 30 like gold (Au), silver (Ag), etc.

The supporting portion 50 may be formed using insulating materials such as poly methyl methacrylate (PMMA), silicon nitride (SiNx), etc.

The rear end portion of the electron emission materials 40 may be electrically connected to the cathode 20. Further, the rear end portion of the electron emission materials 40 may make physically contact with a side face of the cathode 20 and may be fixed to the side face of the cathode 20. In case that the rear end portion of the electron emission materials 40 is fixed to the cathode 20, the rear end portion of the electron emission materials 40 may be partially buried at the cathode 20. Here, when the electron emission materials 40 are partially buried, the cathode 20 may have a two-layer structure and the electron emission materials 40 may be inset between two layers. The cathode 20 having the two layer structure may be selectively employed to the lateral field emission device in FIGS. 1 and 2.

The substrate 10 may have either a single layer structure or a multi layer structure. For example, the substrate 10 includes a silicon wafer and an oxide layer formed on a surface of the silicon wafer. Here, the silicon wafer may correspond to a substrate body 10a and the oxide layer may correspond to an insulation layer 10b.

Figure 5:
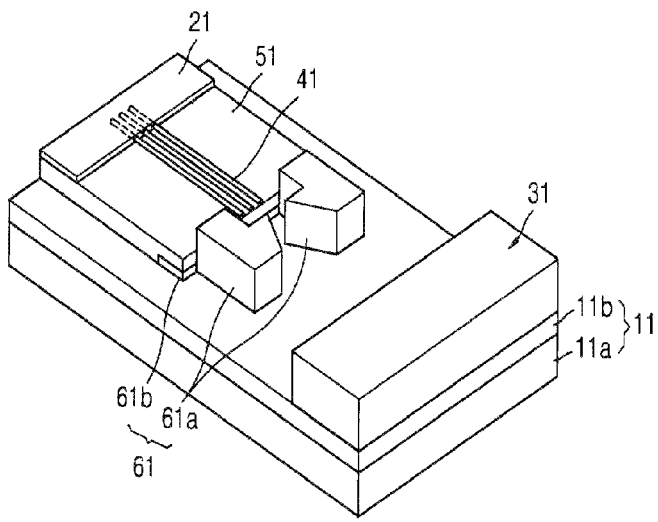
FIG. 5 is a perspective view illustrating a lateral field emission device having a three electrode structure in accordance with still another example embodiment of the present invention.
Figure 6:
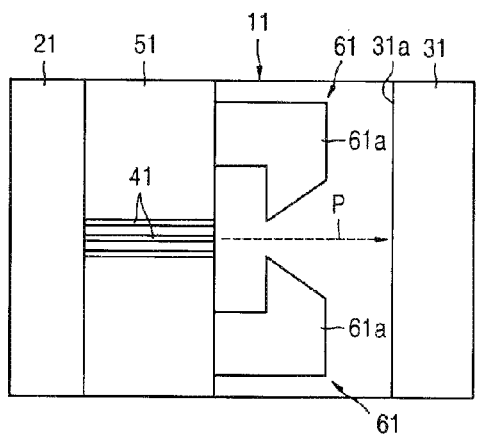
FIG. 6 is a plan view of the lateral field emission device in FIG. 5.

FIG. 5 is a perspective view illustrating a lateral field emission device having a three electrode structure in accordance with still another example embodiment of the present invention. FIG. 6 is a plan view of the lateral field emission device in FIG. 5.

Referring to FIGS. 5 and 6, a lateral field emission device in accordance with another example embodiment of the present invention includes a substrate 11, a cathode structure K having a supporting portion 51, a cathode 21 and electron emission materials 41 and an anode 31.

The anode 31 is positioned on one side portion of the substrate 11 (the right side of the substrate in FIGS. 5 and 6). The anode 31 may include metal like gold (Au), silver (Ag), etc. The cathode structure K including the cathode 21, the electron emission materials 41 and the supporting portion 51 is positioned on another side portion of the substrate 11. The supporting portion 51 is disposed beneath the cathode 21 and the electron emission materials 41 to support the cathode 21 and the electron emission materials 41. The supporting portion 51 may have a predetermined thickness (height). A gate 61 may be further disposed on a central portion of the substrate 11. The gate 61 may include gate members 61a and a gate connecting member 61b (or a gate address line). The gate members 61a are positioned at both sides of an electron transport pathway P which extends from the electron emission materials 41 to the anode 31.

The gate members 61a may include a conductive material such as metal like gold (Au), silver (Ag), etc., as the anode 31 includes. The gate members 61a may have a thickness (height) enough to cover the electron transport pathway P at both sides of the electron transport pathway P such that the gate members 61a may generate an electric field to control a path of electrons.

The cathode structure K may include the supporting portion 51, the cathode 21 formed on the supporting portion 51 and the electron emission materials 41 formed on the supporting portion 51. The supporting portion 51 may be formed using insulating materials such as poly methyl methacrylate (PMMA), silicon nitride (SiNx), etc. The cathode 21 may cover a rear portion of the electron emission materials 41. That is, after the electron emission materials 41 are arranged on the supporting portion 51, the cathode 21 is formed to partially cover the electron emission materials 41. When the lateral field emission device having the cathode structure as shown in FIGS. 5 and 6 may exclude the gate 61, a lateral field emission device having a two electrode (diode) structure may be formed.

According to example embodiments, the lateral field emission device may exclude a spacer which may be required in existing lateral field emission device having a vertical structure such that a process for forming the spacer may be omitted. Especially, a plurality of lateral field emission devices may be formed on one face of the substrate to manufacture an array of the lateral field emission devices. Further, if necessary, the array of the lateral field emission devices is divided to form a plurality of singular lateral field emission devices. The lateral field emission device may be applied into various electrical devices. For example, the electrical devices include a lamp, a display device, a backlight unit for a flat panel display, an electrical source for a high output microwave. Moreover, it may be possible to independently operate one of the singular lateral field emission devices, which is selected from the array of the lateral field emission device. A plurality of lateral field emission devices may be electrically connected to one another. Thus, it may be possible to realize an integrated field emission device having a structure similar to that of a solid semiconductor device.

Hereinafter, methods of manufacturing lateral field emission devices in accordance with example embodiments will be described.

FIGS. 7 to 13 are perspective views illustrating a method of manufacturing a lateral field emission device in FIGS. 1 and 2 in accordance with one example embodiment of the present invention.

Figure 7:
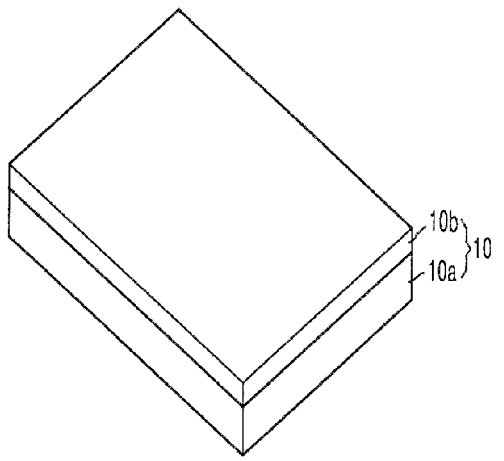
FIGS. 7 to 13 are perspective views illustrating a method of manufacturing a lateral field emission device in FIGS. 1 and 2 in accordance with one example embodiment of the present invention.

Referring to FIG. 7, a substrate 10 is provided. The substrate 10 may be formed using an insulating material having an insulating surface such as glass and sapphire. The substrate 10 may be formed having a silicon body 10a of silicon wafer and an oxide layer 10b formed on the silicon body 10a.

Figure 8:
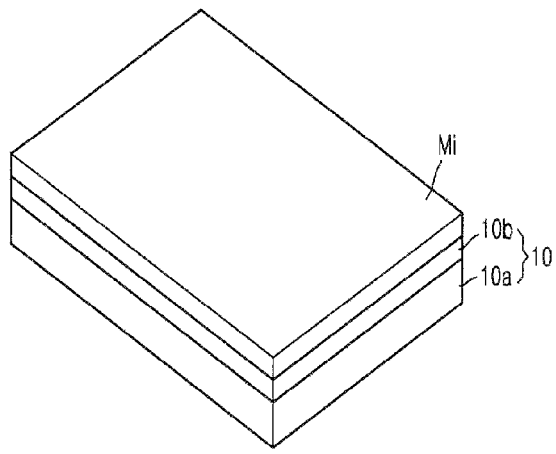

Referring to FIG. 8, an insulation material layer Mi is formed on the substrate 10. The insulation material layer Mi may be formed for forming a supporting portion 50 as shown in FIGS. 1 and 2. The insulation material layer Mi may be formed using poly methyl methacrylate (PMMA), silicon nitride (SiNx), etc. The insulation material layer Mi may be formed during a physical vapor deposition process like a sputtering process, or a chemical vapor deposition process having a chemical reaction.

Figure 9:
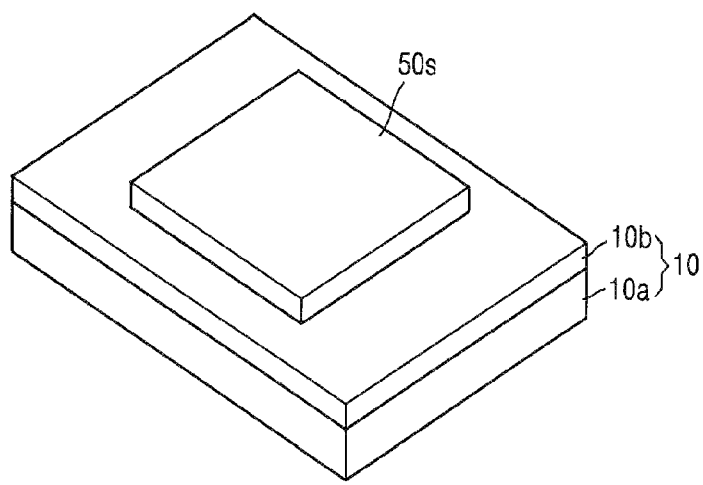

Referring to FIG. 9, the insulation material layer Mi is patterned to form a semi-finished supporting portion 50s having an initial shape for forming the supporting portion 50. The semi-finished supporting portion 50s may have a length to correspond to a distance between a cathode 20 and an anode 30 and may have a width enough to arrange electron emission materials 40.

In order to pattern the insulation material layer Mi, a wet patterning process or a dry patterning process may be performed. More particularly, a photo-lithographic process or an electron beam etching process may be carried out.

Figure 10:
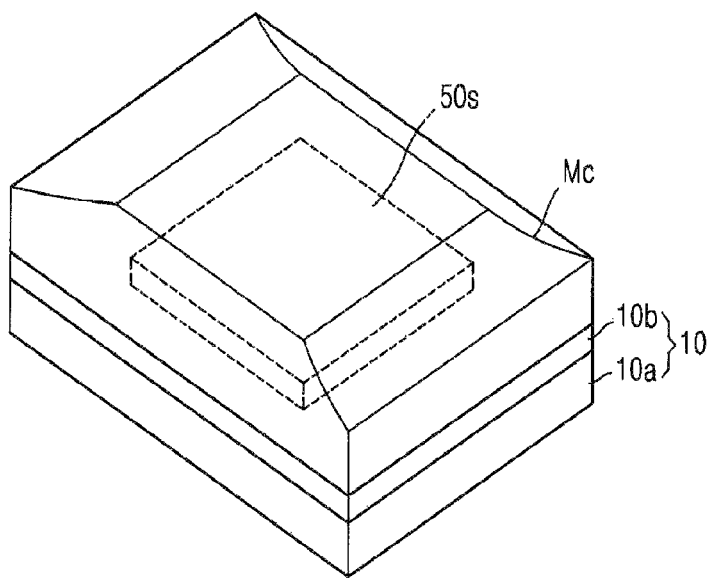

Referring to FIG. 10, a conductive material layer Mc is formed on the substrate 10 to cover the semi-finished supporting portion 50s. The conductive material layer Mc may be formed for forming the cathode 20 and the anode 30. The conductive material layer Mc may be formed using metal like gold (Au), silver (Ag), etc. The conductive material layer Mc may be formed through a physical vapor deposition process like a thermal deposition process, an electron beam deposition process, a sputtering process, etc.

Figure 11:
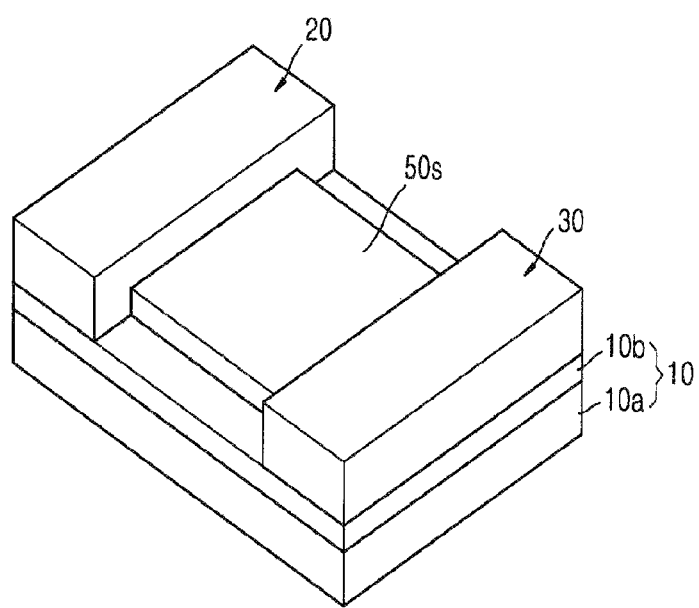

Referring to FIG. 11, the conductive material layer Mc is patterned to form the cathode 20 and the anode 30 at both sides of the semi-finished supporting portion 50s. A wet process or a dry process may be carried out for forming the cathode 20 and the anode 30.

Figure 12:
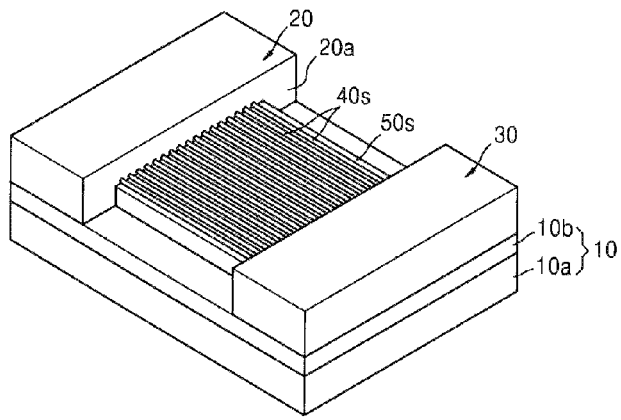

Referring to FIG. 12, the electron emission materials 40 are arranged on the semi-finished supporting portion 50s and between the cathode 20 and the anode 30. The electron emission materials 40 may be arranged on the semi-finished supporting portion 50s by an electrophoresis process. That is, an adequate voltage is applied to both the cathode 20 and the anode 30 in an electrolyte solution having dispersed electron emission materials. The electron emission materials 40s are arranged in a direction of an electric field. Since the electrophoresis process is carried in the electrolyte solution, a drying process may be further performed after forming the electron emission materials 40s.

Alternatively, the electron emission materials 40s may be directly formed on the semi-finished supporting portion 50s instead of the electrophoresis process. The technical scope of the present invention may not be limited to various processes for forming the electron emission material on the semi-finished supporting portion.

Figure 13:
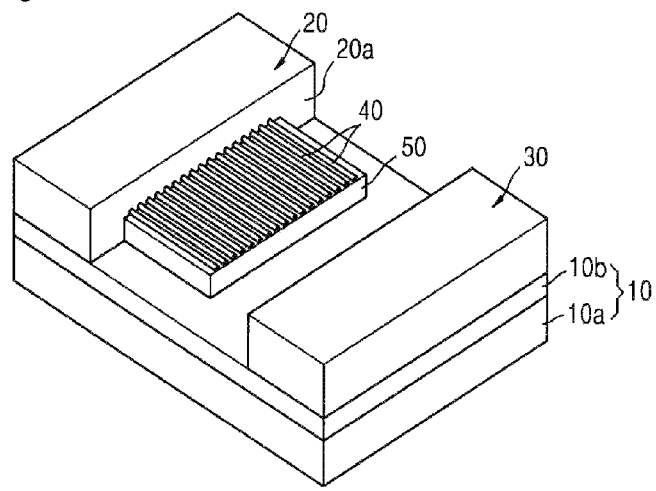

Referring to FIG. 13, the semi-finished supporting portion 50s and the electron emission materials 40s are patterned to form the supporting portion 50 and the electron emission materials 40 which are spaced apart from the anode 30 at a predetermined distance. As a result, a lateral field emission device having a two electrode (diode) structure is completed as shown in FIG. 13. Here, the lateral field emission device may keep the electron emission materials 40 electrically connected to the cathode 20.

FIGS. 14 to 20 are perspective views illustrating a method of manufacturing a lateral field emission device in FIGS. 3 and 4 in accordance with one example embodiment of the present invention.

Figure 14:
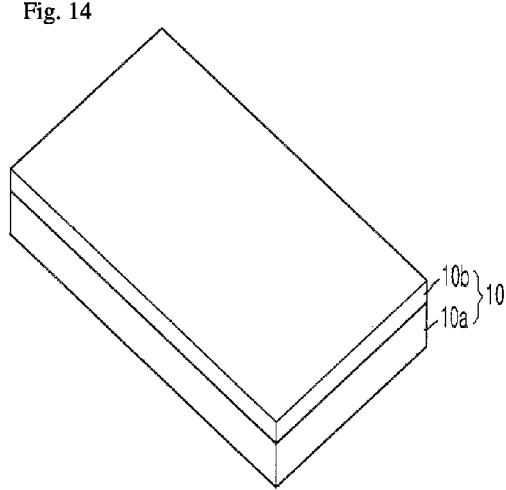
FIGS. 14 to 20 are perspective views illustrating a method of manufacturing a lateral field emission device in FIGS. 3 and 4 in accordance with another example embodiment of the present invention.

Referring to FIG. 14, a substrate 10 is provided. The substrate 10 may be formed using an insulating material having an insulating surface such as glass and sapphire. The substrate 10 may be formed having a silicon body 10a of silicon wafer and an oxide layer 10b formed on the silicon body 10a.

Figure 15:
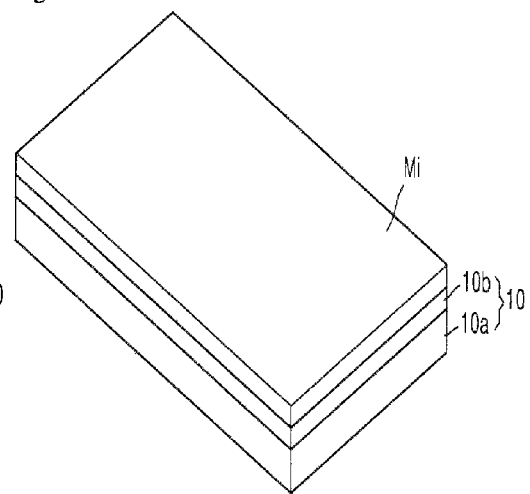

Referring to FIG. 15, an insulation material layer Mi is formed on the substrate 10. The insulation material layer Mi may be formed for forming a supporting portion 50. The insulation material layer Mi may be formed using poly methyl methacrylate (PMMA), silicon nitride (SiNx), etc. The insulation material layer Mi may be formed during a physical vapor deposition process like a sputtering process, or a chemical vapor deposition process having a chemical reaction.

Figure 16:
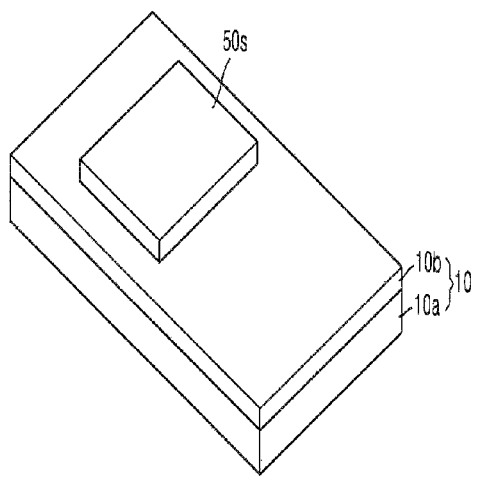

Referring to FIG. 16, the insulation material layer Mi is patterned to form a semi-finished supporting portion 50s having an initial shape for forming the supporting portion 50 later. The semi-finished supporting portion 50s may have a length to correspond to a distance between a cathode 20 and an anode 30 and may have a width enough to arrange electron emission materials 40.

In order to form a semi-finished supporting portion 50s, a wet patterning process or a dry patterning process may be performed. More particularly, a photo-lithographic process or an electron beam etching process may be carried out.

Figure 17:
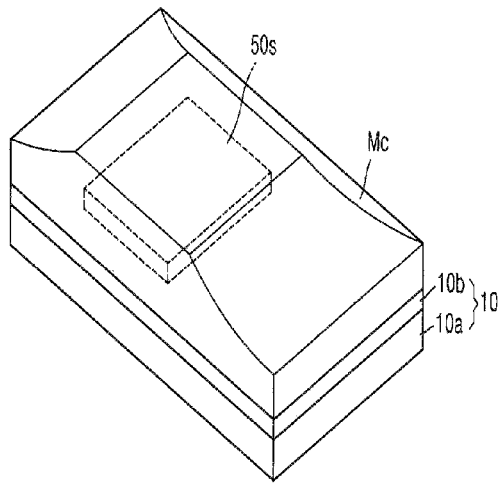

Referring to FIG. 17, a conductive material layer Mc is formed on the substrate 10 to cover the semi-finished supporting portion 50s. The conductive material layer Mc may be formed for forming the cathode 20, the anode 30 and a gate 60 disposed between the cathode 20 and the anode 30. The conductive material layer Mc may be formed using metal like gold (Au), silver (Ag), etc. The conductive material layer Mc may be formed during a physical vapor deposition process like a thermal deposition process, an electron beam deposition process, a sputtering process, etc.

Figure 18:
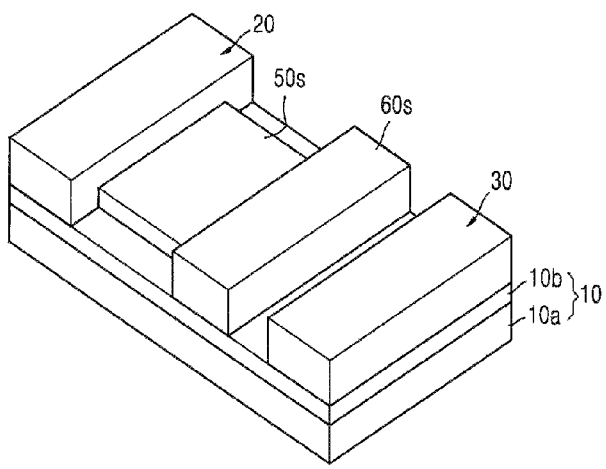

Referring to FIG. 18, the conductive material layer Mc is patterned to form the cathode 20, the anode 30 and a semi-finished gate 60s between the cathode 20 and the anode 30. The cathode 20 and the semi-finished gate 60s are formed at both sides of the semi-finished supporting portion 50s. A process for forming the cathode 20, the anode 30 and the semi-finished gate 60s may include a dry process or a wet process.

Figure 19:
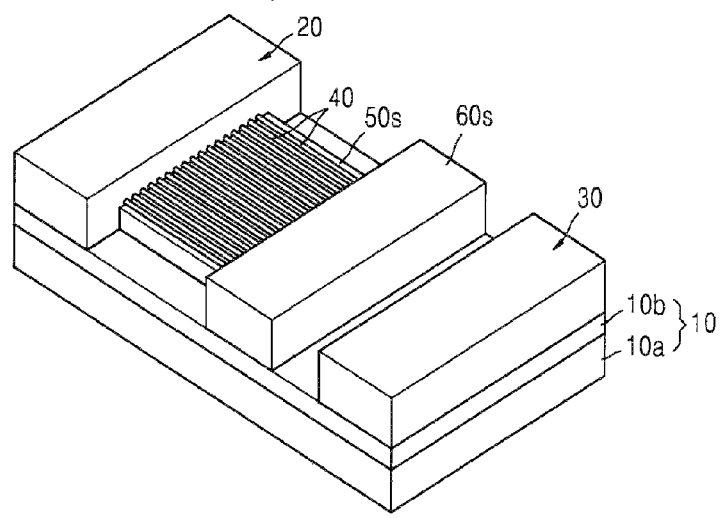

Referring to FIG. 19, the electron emission materials 40 are arranged on the semi-finished supporting portion 50s and between the cathode 20 and the semi-finished gate 60s. The electron emission materials 40 may be arranged on the semi-finished supporting portion 50s by an electrophoresis process. That is, an adequate voltage is applied to both the cathode 20 and the semi-finished gate 60s in an electrolyte solution having dispersed electron emission materials. The electron emission materials 40 are arranged in a direction of an electric field. Since the electrophoresis process is carried in the electrolyte solution, a drying process may be further performed after forming the electron emission materials 40

Alternatively, the electron emission materials 40 may be directly formed on the semi-finished supporting portion 50s instead of the electrophoresis process. The technical scope of the present invention may not be limited to various processes for forming the electron emission material on the semi-finished supporting portion.

Figure 20:
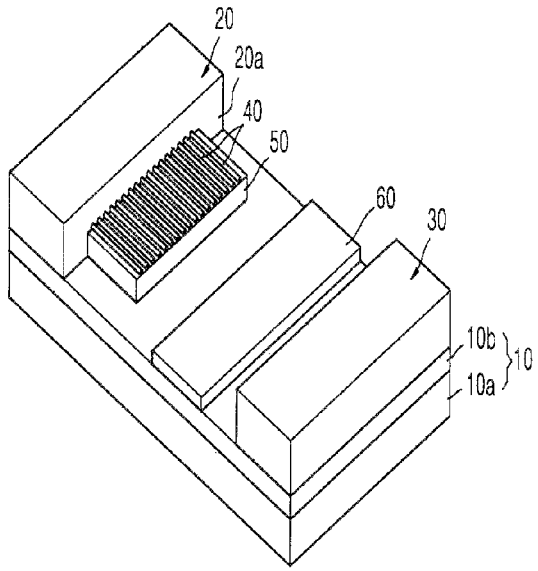

Referring to FIG. 20, the semi-finished supporting portion 50s and the electron emission materials 40 are patterned to form a supporting portion 50 and electron emission materials 40. Further, a thickness of the semi-finished gate 60 is lowered to form a gate 60. As a result, a lateral field emission device having a three electrode (triode) structure is completed as shown in FIG. 20. Thus, the gate 60 is spaced apart from the supporting portion 50 and the electron emission material 40 formed on the supporting portion 50. Here, both a process for etching an upper portion of the semi-finished gate 60s to form the gate 60 having a thickness substantially identical to or smaller than that of the supporting portion 50, and a process for forming the supporting portion 50 and the electron emission materials 40 may be independently carried out, respectively.

FIGS. 21 to 27 are perspective views illustrating a method of manufacturing a lateral field emission device having a three electrode structure in FIGS. 5 and 6 in accordance with one example embodiment of the present invention.

Figure 21:
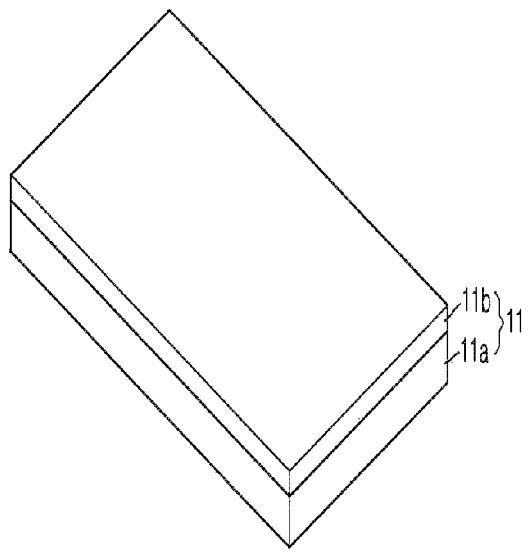
FIGS. 21 to 27 are perspective views illustrating a method of manufacturing a lateral field emission device in FIGS. 5 and 6 in accordance with still another example embodiment of the present invention.

Referring to FIG. 21, a substrate 11 is provided. The substrate 11 may be formed using an insulating material having an insulating surface such as glass and sapphire. The substrate 10 may be formed having a silicon body 10a of silicon wafer and an oxide layer 10b formed on the silicon body 10a.

Figure 22:
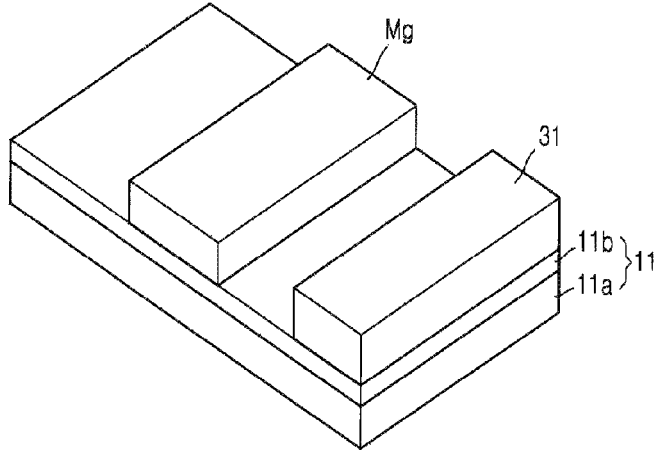

Referring to FIG. 22, an anode 31 and a layer for forming a gate Mg are formed on one side portion of the substrate 41 (the right side of the substrate in FIG. 22) and on a central portion of the substrate 41, respectively, by forming a conductive material layer Mc with using gold (Au), silver (Ag). For example, a metal layer may be formed by depositing conductive materials during a physical vapor deposition process like a thermal deposition process, an electron beam deposition process, a sputtering process, etc. and then, the metal layer is patterned by a wet process or a dry process to form the anode 31 and the layer for forming a gate Mg.

Figure 23:
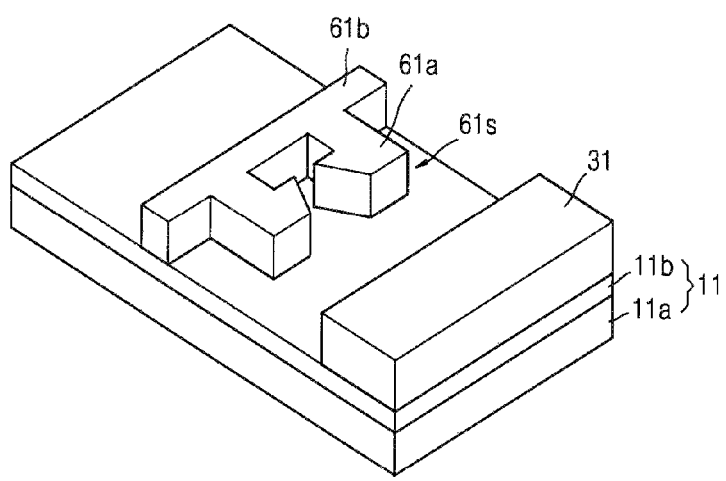

Referring to FIG. 23, the layer for forming a gate Mg is patterned to form a semi-finished gate 60s having two gate members 61a and a gate connecting member 61b.

Figure 24:
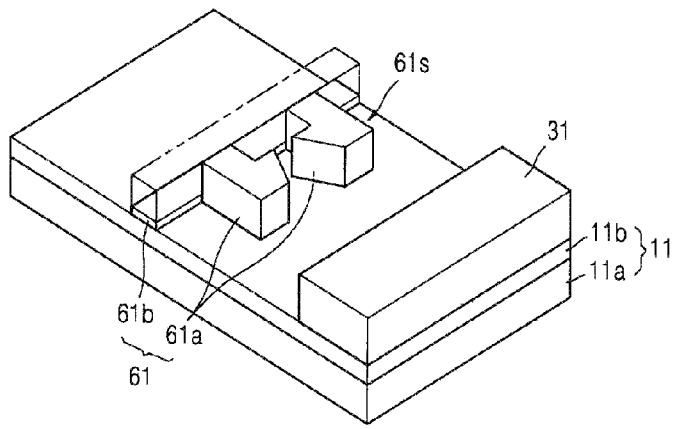

Referring to FIG. 24, the gate connecting member 61b is partially etched to lower a thickness of the gate connecting member 61b. For example, the selective etching process may be carried out using a mask to selectively etch the gate connecting member 61b to a predetermined thickness. The gate connecting member 61b (or a gate address line) may have a thickness as thin as possible, while the gate connecting member 61b is capable of having a resistance value as low as possible.

Figure 25:
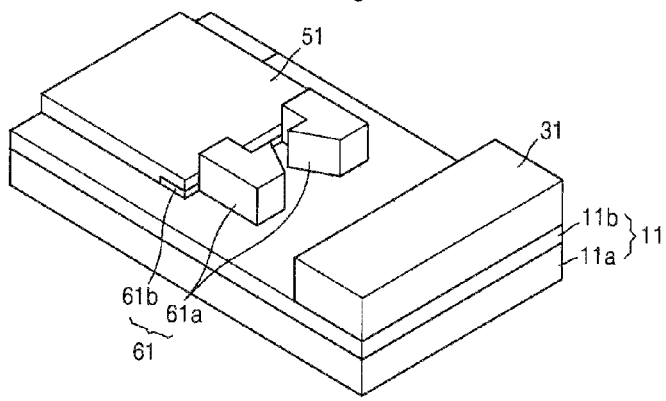

Referring to FIG. 25, a supporting portion 51 is formed on another side portion of the substrate 11 (the left side portion of the substrate in FIG. 25). The supporting portion 51 may have a predetermined thickness. For example, the supporting portion 51 may be formed by depositing an insulating layer using poly methyl methacrylate (PMMA), silicon nitride (SiNx), etc. during a physical vapor deposition process like a sputtering process, or a chemical vapor deposition process having a chemical reaction, and then etching the insulating layer by a wet or a dry process. The gate connecting member 61b may be covered by the supporting portion 51. The supporting portion 51 may have a thickness and a width enough to arrange a cathode 21 and electron emission materials 41 thereon.

Figure 26:
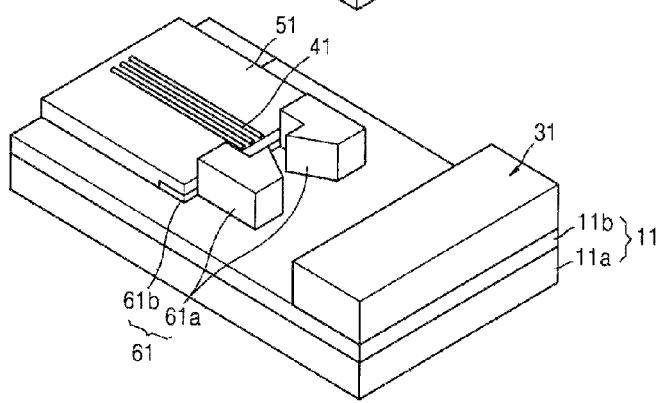

Referring to FIG. 26, the electron emission materials 41 are arranged on the supporting portion 51. The electron emission materials 41 may extend in a direction between the gate members 61a. In other words, the electron emission materials 40 may extend in a direction substantially in parallel with respect to an electron transport pathway P.

Figure 27:
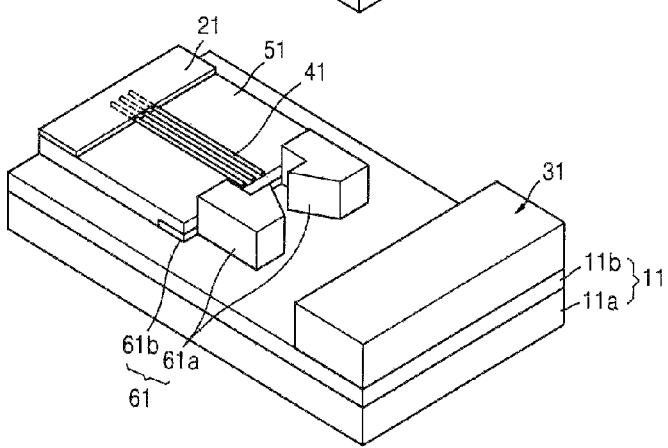

Referring to FIG. 27, the cathode 21 is formed on a side portion of the supporting portion 51 (the left side portion of supporting portion in FIG. 27). Thus, a lateral field emission device having a three electrode (triode) structure is completed as shown in FIG. 27. The cathode 21 may be formed covering a rear portion of the electron emission materials. The cathode may be formed by a deposition process using a mask or a screen printing process using a conductive paste and a mask.

According to some example embodiments, the lateral field emission device may exclude a spacer which may be required in existing lateral field emission device having a vertical structure to omit process for forming the spacer. Especially, the lateral field emission device may be formed on one face of the substrate to manufacture an array of lateral field emission devices which a plurality of the lateral field emission devices is arranged in an array on the substrate. Further, if necessary, the array of the lateral field emission devices is divided to form a singular lateral field emission device. The lateral field emission device may be applied into various electrical devices. For example, the electrical devices include a lamp, a display device, a backlight unit for a flat panel display, an electrical source for a high output microwave. Moreover, it may be possible to independently operate the singular lateral field emission device which is selected from the array of the lateral field emission device. A plurality of lateral field emission devices may be electrically connected to one another. Thus, it may be possible to realize an integrated field emission device having a structure similar to that of a solid semiconductor device.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A lateral field emission device comprising:
a substrate;
electron emission materials arranged in a direction with respect to the substrate;
a supporting portion disposed on the substrate, the supporting portion supporting the electron emission materials;
a cathode disposed on the substrate, the cathode being electrically connected to the electron emission materials; and
an anode disposed on the substrate, the anode being opposite to the cathode, wherein the anode includes a side face at which electrons from the electron emission materials collide and a front end portion of the electron emission materials is opposite to a central portion of the side face of the anode, and the supporting portion, the cathode and the anode are coplanarly disposed directly on the substrate.

2. The lateral field emission device of claim 1, further comprising a gate disposed between the cathode and the anode.

3. The lateral field emission device of claim 2, wherein the gate is disposed under an electron transport pathway between the electron emission materials and the anode.

4. The lateral field emission device of claim 2, wherein the gate includes gate members disposed at both sides of an electron transport pathway between the electron emission materials and the anode.

5. The lateral field emission device of claim 1, wherein the electron emission materials include at least one of a carbon nano tube, a nano carbon material, a semiconductor nanowire, a metal nanowire, a carbon nanoplate, a graphene, and a graphene oxide.

6. The lateral field emission device of claim 2, wherein the cathode, the anode and the gate include a conductive material substantially identical to one another or different from one another.

7. A lateral field emission device comprising:
a substrate;
a cathode structure disposed on one side portion of the substrate, the cathode structure including a supporting portion having a predetermined thickness, a cathode disposed on the supporting portion and electron emission materials electrically connected to the cathode; and
an anode disposed on another side portion of the substrate, the anode being opposite the cathode structure,
wherein the anode includes a side face at which electrons from the electron emission materials collide and a front end portion of the electron emission materials is opposite to a central portion of the side face of the anode, and the supporting portion, the cathode and the anode are coplanarly disposed directly on the substrate.

8. The lateral field emission device of claim 7, wherein the cathode partially covers the electron emission materials in the cathode structure.

9. The lateral field emission device of claim 7, further comprising a gate disposed between the cathode structure and the anode.

10. The lateral field emission device of claim 9, wherein the gate includes gate members disposed at both sides of an electron transport pathway between the cathode structure and the anode.

11. The lateral field emission device of claim 9, wherein the cathode, the anode and the gate include a conductive material substantially identical to one another or different from one another.

12. The lateral field emission device of claim 7, wherein the electron emission materials include at least one of a carbon nano tube, a nano carbon material, a semiconductor nanowire, a metal nanowire, a carbon nanoplate, a graphene, and a graphene oxide.

* * * * *